Primary Examiner—Archie R. Borchelt
Attorney—Michael S. Striker

United States Patent
Früngel et al.

[15] 3,666,945
[45] May 30, 1972

[54] ARRANGEMENT FOR MEASURING THE CONCENTRATION OF FLUORESCENT MATERIALS IN AIR AND WATER

[72] Inventors: Frank Früngel, Hamburg, Germany; Peter Krawarik, Princeton, N.J.

[73] Assignee: Impulsphysik GmbH, Hamburg, Germany

[22] Filed: July 30, 1970

[21] Appl. No.: 59,630

[30] Foreign Application Priority Data

Aug. 2, 1969 Germany..................P 19 39 524.5

[52] U.S. Cl. ...................................250/71 R, 250/83.3 UV
[51] Int. Cl. ..........................................................G01n 21/22
[58] Field of Search...................250/71 R, 71 G, 83.3 UV

[56] References Cited

UNITED STATES PATENTS 3,501,639 3/1970 Monroe............................250/71 R X
3,497,690 2/1970 Wheeless, Jr. et al................250/71 R
3,443,095 5/1969 Frungel..........................250/83.3 UV

[57] ABSTRACT

An arrangement through which the concentration of fluorescent materials, when present in low quantities, may be measured within a fluid. A transmitter is flashed periodically at a rate corresponding to the rate that measurements are taken, for the purpose of exciting the fluorescent materials. Filters and optical systems are provided at the transmitter for transmitting the appropriate light. A receiver spaced from the transmitter or light source is also equipped with appropriate filters and optical systems, and receives on a photosensor, the radiation from the fluorescent materials. The resultant electrical signals from the photosensors are amplified and compensated against daylight and cloudy effects of the medium, through an auxiliary amplifier.

18 Claims, 2 Drawing Figures

ARRANGEMENT FOR MEASURING THE CONCENTRATION OF FLUORESCENT MATERIALS IN AIR AND WATER

BACKGROUND OF THE INVENTION

In the field of oceanology, it is often required and useful to quantitatively measure the amount of fluorescent material, when present in minute quantities, or when the concentrations of such fluorescent materials is substantially low. Such quantitative measurements of fluorescent materials are also very applicable in measurements associated with air pollution. The fluorescent material for these applications can, for example, consist of rhodamine B which is artificially introduced into a stream or sea current. Algae in the form of bioplasma which prevail in natural form, may also serve for this purpose. When dealing with air, suspended particles which fluoresce under optical excitation, may be applicable.

In oceanology, a procedure was carried out in which water was pumped through appropriate apparatus, from a ship through an interconnecting pipe or tube. The water was then subjected to an optically filtered light source which provided a wavelength for fluorescent excitation. A photomultiplier with a separate filter which transmits only for the excited fluorescent radiation, detects the intensity of the resulting fluorescent light. Whereas the filter of the photomultiplier transmits the excited fluorescent radiation, it does not transmit the fluorescent excitation light.

The methods used, heretofore, have been found to be satisfactory from the viewpoint of increased sea depths, where it is increasingly difficult to pump the water through the pipe or tube with sufficient rapidity into the measuring apparatus, in order to avoid long delays between the taking of a sample and the instant of measurement. The same problem exists when taking measurements in the atmosphere whereby air flows to the measuring instrument and measuring location through tubing.

One concept is to place the measuring apparatus at the measuring location, and to construct the apparatus so that it can resist its environment such as high pressure. However, limiting conditions are here imposed in view of the required power supply. Thus, the fluorescent excitation light source must have an incandescent lamp with substantially high power capacity within the region of several hundred watts. As a result, the interconnecting cable from the ship to the measuring apparatus must have a sufficiently large cross-sectional area. As the cross-sectional area of such an interconnecting cable increases, however, there is a greater tendency for the cable to break under its own weight. The weight of the cable under such conditions is considerable, and the distance between the ship and the measuring apparatus must necessarily be limited.

Accordingly, it is an object of the present invention to provide a novel arrangement which avoids the disadvantages enumerated above. It is also the object of the present invention to provide an arrangement of the foregoing character, in which substantially high cable expenditures and costs are significantly reduced.

SUMMARY OF THE INVENTION

An arrangement for measuring the concentration of fluorescent materials in water or air, in which the concentration is substantially low. A transmitter including a flash discharge lamp in the form of a spark discharge lamp is provided with a filter adapted to fluorescent radiation and optical systems for directing the radiation through the medium in which the concentration is to be measured. The lamp is periodically flashed through a flashing circuit that provides the energy to the lamp. The flashing interval is substantially equal to the rate at which measurements are taken. The duration of the flashing interval, at the same time, exceeds the fluorescent response time or fluorescent delay or inertia interval. Spaced from the light source or transmitter is a receiver also equipped with filter and optical systems. The filters may be remotely adjusted through a filter control arrangement, so that the apparatus is adapted to specific fluorescent materials. The amplifier at the receiver can be compensated through an auxiliary receiver, against daylight effects, as well as cloudy effects of the medium. The apparatus may be powered through batteries, and the entire system may be located on a buoy. A signal recorder may be provided to record the results from the measurements, and thereby make the unit a self-contained device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
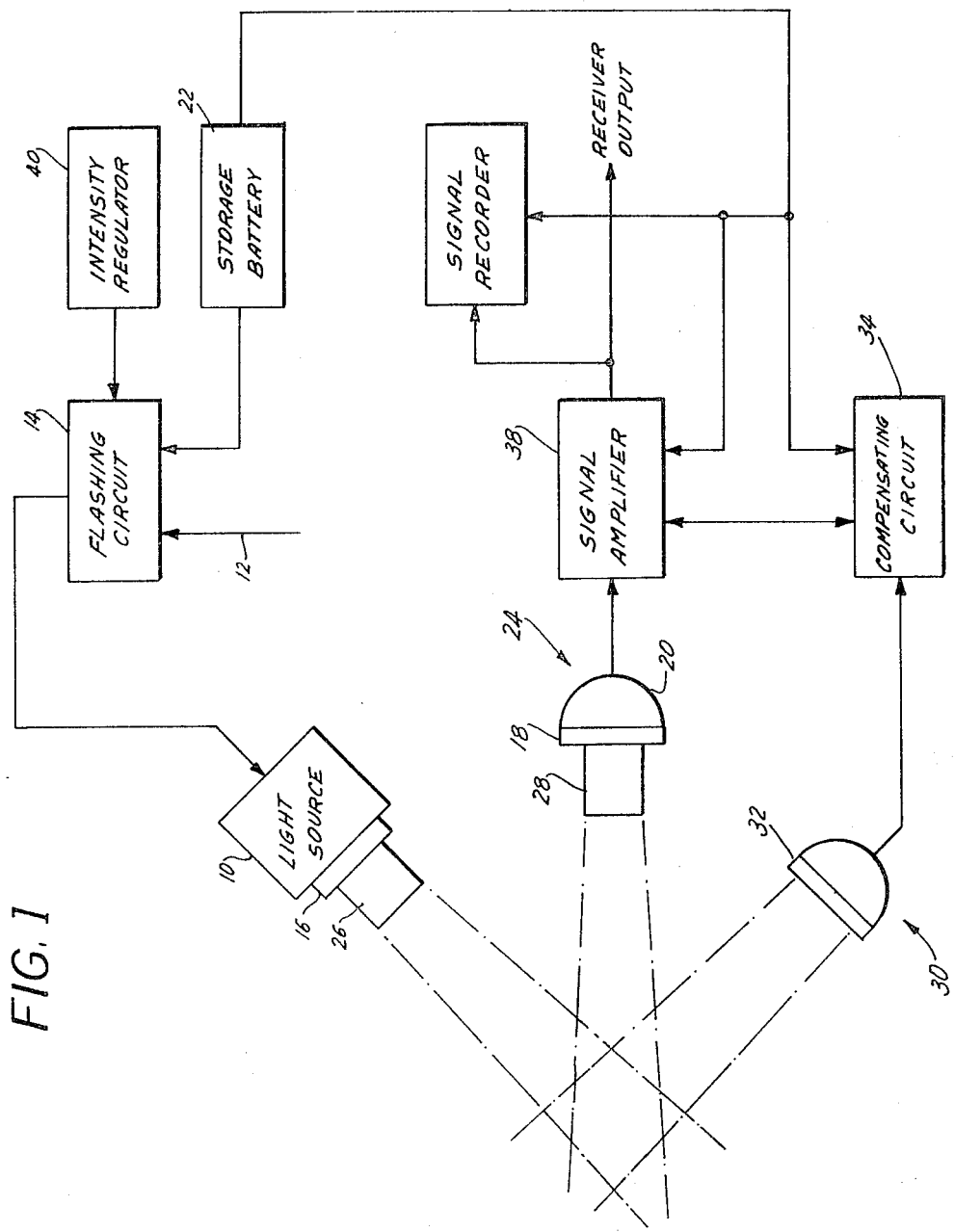
FIG. 1 is a functional schematic diagram showing the transmitter and receiver components for measuring the concentration of fluorescent materials within a medium, in accordance with the present invention.
Figure 2:
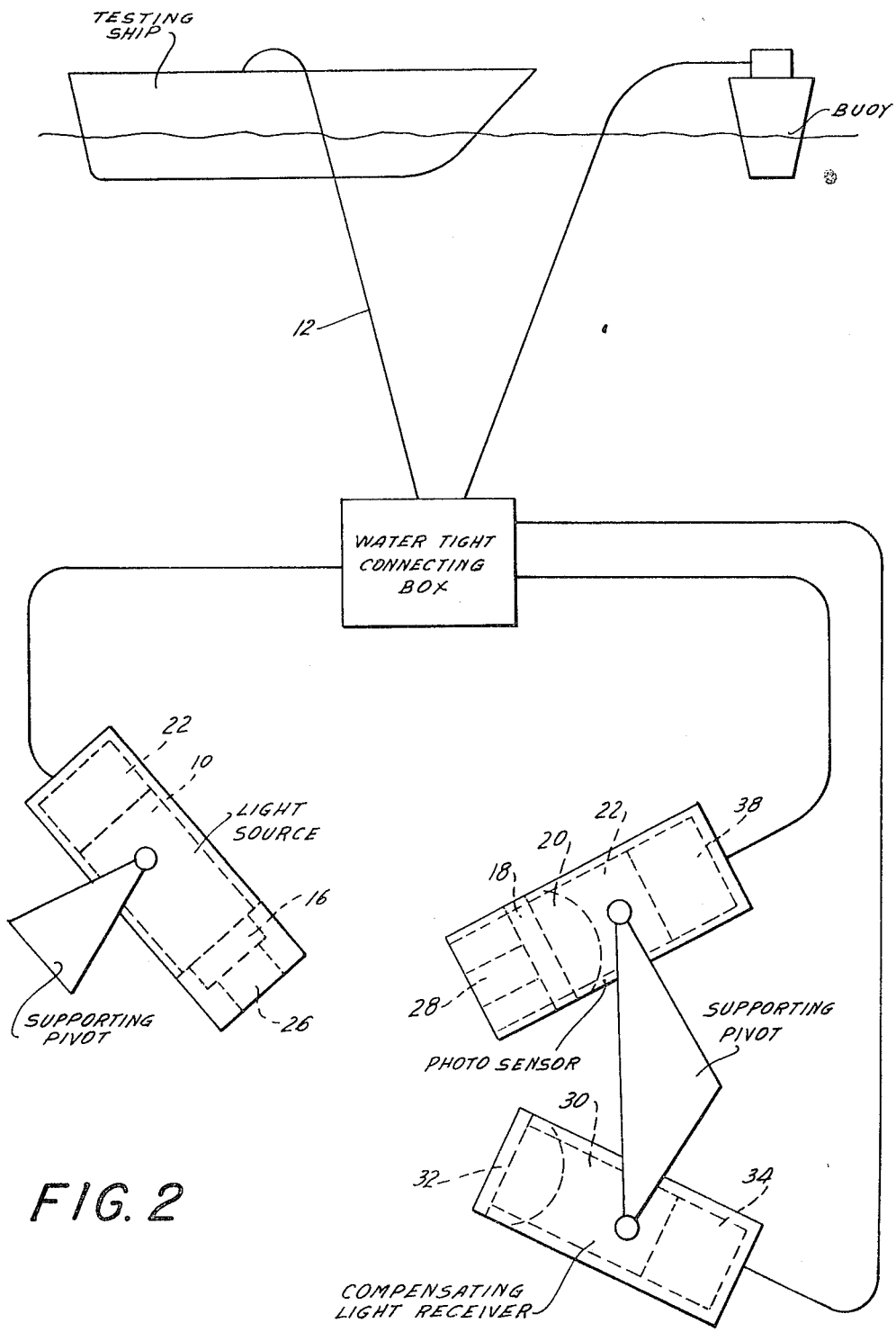
FIG. 2 is a schematic diagram of the relative positioning of the components of FIG. 1, as well as their operative interconnections.

Referring to the drawing, a pulsed light source 10 is used with substantially short waves in the radiation spectrum. This pulsed light source is used to avoid high wattage consumption and simultaneously accompanying increased light intensity of the lamp for fluorescent excitation. The pulse duration for the lamp is made as short as possible, but still long enough to produce the fluorescent excitation with negligible inertia or delay. The flashing duration is, thereby, longer than $10^{-8}$ seconds, but shorter than $10^{-5}$ seconds. When this lamp is operated once every second with a flashing duration of, for example, 1 microsecond, the average time interval in which the lamp is in operation is only $10^{-6}$.

When the flash is to have an intensity which is $10^3$ times that from a powered incandescent lamp, the power consumption of the flash is then only $10^{116}$ $3$ compared to that of the incandescent lamp. Whereas the high voltage generator required for driving the flashing lamp reduces the efficiency of the arrangement, a power advantage of $10^2$ still remains nevertheless. Accordingly, only a substantially thin cable is required for the purpose of driving such a flashing lamp. Thus, the cable can be provided, for example, with a steel core which is highly resistant to breakage, when extended between the ship and the measuring apparatus.

When using a cable with a steel core due to the low power requirements, a substantially high electrical resistance is encountered in view of the relatively large length of the cable. Accordingly, it is necessary to provide a relatively equal high resistance load at the end of the cable in order to assure that the fluorimeter is provided with sufficient voltage. The length of the cable, the resistance of the cable to breakage or its tensile strength, the electrical resistance, the flashing frequency, and the flashing energy are all functionally interrelated. The parameters must be selected so that the task to be carried out in the oceanology investigation can yield meaningful results. When a cable 12 is used which requires that only one watt be taken when the voltage is reduced by 10 percent compared to the voltage aboard the ship, the average power requirement is only one-half watt when the efficiency of the converter is only 50 percent for the voltage supply. This corresponds to an operating flash appearing once per second, with the storage energy in the discharge capacitor of 0.5 joules. The converter and discharge capacitor are mounted within the flashing circuit 14.

For reduced measuring speeds as, for example, one flash per minute, it is possible to apply corresponding higher energy quantities, such as 30 watt-seconds in this case. This results in substantially high energy spikes within the region of $10^6$ to $10^8$cd. Such energy spikes are several tenfolds higher than the sensitivity of conventional measuring arrangements with incandescent lamp and multiplier. It is also possible to apply thereby large volumes to be measured and which do not comply with the statistics of locality. In this case, concentration measurements can also be carried out when the fluorescent material is present in extreme minute quantities. It is also possible to apply this method to measurements in substantially low air pollutions in the atmosphere or low prevalence of bioplasma in sea water.

A particular advantage is realized from the condition that spark discharge lamps have their maximum radiation in the blue or ultraviolet region. Furthermore, this maximum radiation can be adjusted or compensated through selection of the gas pressure and the electrical parameters for the desired fluorescent excitation wavelength.

When operating in the free atmosphere, it may be further useful, in accordance with the present invention, to allow the arrangement to operate in the substantially intermediate ultraviolet region, and to detect thereby fluorescent materials which may be present in the air as, for example, bacteria or microscopic particles which fluoresce through their own property. Under these conditions, the excitation light must naturally be of a short wave as, for example, it must be in the short ultrviolet region and somewhat in the region of the mercury resonance line. The filter combination, as well as the material for enveloping the spark discharge lamp and for coating the mirror, must also be correspondingly selected.

The photomultipliers used, heretofore, are exceptionally sensitive to daylight. The photocathode in such devices has a D.C. current emission, as soon as the cathode receives daylight as a result of atmospheric stray light or light which is transmitted through the water layer surrounding the measuring apparatus. This D.C. current emission from the photocathode is amplified precisely as the signal by, for example, a factor of $10^6$. As a result, both severe electronic noise appears at the anode of the multiplier with simultaneous thermal overloading of the electrodes. In view of these conditions, the fluorimeter was, in the past, arranged in a dark location with the photomultiplier, and the medium to be measured was pumped therethrough.

In accordance with the combination of the present invention in which the light intensity is increased by, for example, a factor of $10^3$ through the microsecond pulse, it is possible to dispense with the multiplier, and to substitute a semi-conducting photodiode in place of the photomultiplier. The semi-conductor photodiode has a quantum efficiency which is higher than the photocathode of the photomultiplier, by a factor of 10. Sensitivity is lost to an extent through omission of the amplifying property of the photomultiplier. However, by inserting the semi-conductor sensor which has no amplifying properties, a higher initial signal is realized due to the higher quantum efficiency. The signal operates together with the considerably increased lamp pulse intensity, so that no sensitivity loss is, in reality, realized compared to conventional methods. In place of the photodiode, it is of course also possible to use a photomultiplier which operates with only very small number of stages as, for example, only three stages. With such a photomultiplier, an exceptionally small amplification compared to conventional applications is obtained with corresponding reduced light sensitivity.

Through the insertion of the pulsed light source and the application of a pulsed light receiver, it is possible to use the circuit principles from the field of meteorology. In this field, apparatuses in the form of transmission meters or diffused light meters for measuring visibility, have been used for many years, and their developments may be drawn upon. For example, the exact logarithm to the base 10 is used as the measured results for the intensity of the received light pulse. The amplifier circuits which are designed in the form of pulse circuits, do not amplify any D.C. current or low-frequency components, and thereby they make the pulsed light receiver unsensitive to continuous light. This is predicated on the condition that the optical sensor not be sensitive with respect to impinging continuous light. In view of the comparable high or large signal used for operating purposes, it is possible to carry out such operation with substantially smaller amplification factors. The apparatus, moreover, becomes thereby more compact, lighter in weight, and requires less power consumption.

Through simultaneous application of the three steps described above, one realizes a fluorimeter which may be powered through a substantially thin cable with high tensile strength. Such a fluorimeter, furthermore, has high sensitivity, is free from influences of daylight conditions, and the unit can be used at any desired altitude or sea depth from zero to several hundred meters, depending upon the compression strength of the cylinder which surrounds the unit. The apparatus can be used either for measuring the quantity of fluorescent rhodaminé B or the amount of bioplasma, depending upon the optical filters 16 and 18 used at the pulse light transmitter 10 or photosensor 20 at the receiving station. The apparatus can be used, in this manner, also for quantitative fluorescent measurements with regard to biological or inorganic particles suspended in the air. The filters and spectral regions required for this purpose, can be derived from tables which are readily available in the literature well known in the art. In view of the substantially small power reception of the apparatus, the process is adapted to operate in conjunction with independently small batteries 22, for an extended period of time. Thus, the power for the receiving apparatus can be less than 1 watt, and since such 1 watt of power extends, for example, over 1,000 measurement hours, this corresponds to 1 kilowatt-hour. Such energy can be feasibly stored within a battery. A combination with small radioactive or thermoelectric current generators is also possible.

In carrying out the present invention, it is desirable to maintain the pulse frequency of the transmitter at a low value to the extent that variations in the concentration to be measured may be readily detected when they occur over time. Thus, the pulse frequency of the transmitter may be, for example, only 1 pulse per minute. It is also desirable in this regard, to design the receiver 24 so that the processing of the signals which are received, is carried out amplitude-wise, in view of the low pulse frequency. The receiver 24 may be designed as a linear, logarithmic, digital or analog unit.

The optical arrangement 26 for guiding the transmitted emission beam at the transmitter can, in this manner, be mounted without space limitations. The optical arrangement can be focused so that it emits parallel rays or it is focused to a point at which the rays are concentrated. The same situation applies to the optical arrangement 28 located at the receiver 24.

In view of the circular character of the fluorescent radiation, the arrangement is adapted to having the axis of the transmitter displaced 90° from that of the receiver. In this manner, direct light at the transmitter as a result of residual transmission of the blocking filter, cannot reach the receiver. When the medium in which measurements are taken is not clouded, it is possible to function or operate without filters at the transmitter or receiver. The added design of the present invention is related to measurements in clouded mediums as, for example, stream water.

When dealing with such clouded mediums, the measured fluorescent value which is received, may provide erroneous results, in view of the light losses through the clouded medium. The clouding effect reduces the intensity of the light from the transmitter to the point of measurement, as well as the light emanating from the fluorescent measured volumes. In order to detect and take into account the clouded aspect and automatically yield meaningful measured results, it is possible to provide an auxiliary fluorescent light receiver 30 which is identical to the receiver 24, and which has the same optical filter as the pulsed light transmitter. The optical filter 32 is directed so that neither the transmitted light or the fluorescent light can be received. At the same time, however, the light diffused as a result of the clouding effect or polluted effect can be received. This diffused light receiver for correcting the measured results, provides increased signals when the clouding effect is particularly severe. At the same time, substantially no signal is emitted from this receiver 30 when the medium in which measurements are taken is clear. Through circuitry already well known in the art, it is possible to take the signals of these two receivers for fluorescent light and diffused light, and to provide an output signal in rectified form which compensates the measured results with respect to losses resulting from the diffused effect caused by the clouding of the medium. Thus, the second receiver 30 serves as a compensating agent for compensating the results of the receiver 24 against the clouding effect of the medium in which measurements are taken. Such compensating circuitry which applies the signal from the receiver 30 to the signal derived from the receiver 24, resides in the compensating unit 34. The solution to this compensating problem was first made possible by designing the apparatus in the form of pulsed circuitry, in accordance with the present invention. Heretofore, only very small measuring volumes were possible with the conventional apparatuses, so that the losses resulting from the clouding effect could be neglected.

It is particularly advantageous to use the method and arrangement, in accordance with the present invention, for the purpose of saving expensive fluorescent materials in quantitative analysis of fluid flows somewhat in the form of sea and stream waters, or in airstreams. The present invention is applicable when a concentration limit of substantially $10^{-11}$ rhodamine B is to be quantitatively detected. As an example, 1 cubic kilometer of sea water corresponds to $10^{15}$ cubic centimeters. In order to attain a measuring limit of substantially $10^{-11}$, it is necessary to use $10^4 \, p = 10$ kp rhodamine B which has a current price of approximately $80.00. With conventional methods, the concentration must be at least 10 times higher. Since a large quantity of $km^3$ is to be part of the measurements, the economic advantages and aspects of the present invention become evident.

The measuring principle of the present invention can be used freely in seawater without any confinements of the measuring space. At the same time, the principle is also applicable to the free atmosphere with, for example, measuring balloons or aircraft. In principle, each volume being measured is subjected to light and is used as a sample of the surrounding fluid or gaseous atmosphere, without the introduction of pipes or tubes. It is also possible to mount the arrangement of the present invention in a fixed place and operated through built-in batteries applicable for longer operating durations, and to produce thereby measured results which can serve simultaneously as stored quantities on a magnetic tape, with the aid of a timing program. When, thereafter, the results are needed, they can be obtained from the tape at particular intervals. It is then possible to combine the arrangement with a radio transmitter which transmits the measured results to a remote location through an antenna. In this manner, no interconnecting cable between the location at which the measurement is taken and the data processing center is required.

Depending upon whether fluorescent material as for example rhodamine B is used or bioplasma is to be measured, filters are used in both the transmitter and the receiver. The filter at the transmitter passes those wavelengths which serve to excite the fluorescent materials. At the receiver end of the circuit, the filter is of narrow band which passes the rays emitted from the fluorescent material. Such rays which are emitted by the fluorescent material are inherently circular rays. It is possible to design and construct the filters of the transmitter and receiver for different substances and to control the filters remotely from a remote control unit 36.

In arranging the present invention, the angle between the optical axes of transmitter and receiver may be freely selected as, for example, 90°. In constructing the light source, furthermore, a light source with internal stabilization and light intensity is desirable. A spark discharge lamp, as conventionally known, may be used for this purpose. The amplifier 38 which is made part of the receiver 24 serves to amplify the electrical signal generated by the photosensor, in the conventional manner. For stabilized intensity regulation of the light source, an intensity regulation circuit 40 may, furthermore, be used in conjunction with the flashing circuit 14 which provides the power for the lamp.

With the present invention, it is possible to tow the measuring apparatus through a thin cable at any desired distance, and to control the apparatus, for example, at any desired depth in water or in the atmosphere. It is possible to mount the apparatus on a buoy or a balloon with built-in batteries, and by using artificial fluorescent materials, it is possible to incur savings thereby. A simple changeover to bioplasma concentration measurements is also possible. At the same time, absorption of light by the measured medium due to cloudy effects can be compensated. This feature allows the scientific investigator to concern himself with the essential problems without having to continuously divert himself to the apparatus.

It will be understood that each of the elements described above, or two or more together, may also find a useful application in other types of constructions differing from the types described above.

While the invention has been illustrated and described as embodied in an arrangement for measuring concentration of fluorescent materials in air and water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. An arrangement for measuring the concentration of fluorescent materials underwater comprising, in combination, a light source with flash discharge lamp means immersed underwater; a source of energy connected to said light source for flashing said lamp means at a frequency equal to the frequency of measurement, the duration of the emitted exciting radiation exceeding the fluorescent response time; underwater receiver means with photosensor means spaced from said light source for receiving fluorescent light transmitted through the water and impinging on said photosensor means, said photosensor means converting said fluorescent light impinging on said photosensor means into a corresponding electrical signal; compensating means for compensating said receiver means against daylight transmitted through the water and impinging upon said photosensor, so that the sensitivity of said receiver means is unaffected by said daylight; and amplifying means connected to said photosensor for amplifying the amplitude of said electrical signal.

2. The arrangement as defined in claim 1 wherein said flash discharge lamp comprises a spark discharge lamp.

3. The arrangement as defined in claim 1 wherein said duration of said emitted exciting radiation is substantially within the range of $10^{-8}$ to $10^{-5}$ seconds.

4. The arrangement as defined in claim 1 wherein said photosensor means comprises a semi-conductor photodiode.

5. The arrangement as defined in claim 1 wherein said photosensor means comprises a photomultiplier having relatively few stages of such a low amplification that under daylight influence the anode current remains in the linear range of its characteristic.

6. The arrangement as defined in claim 1 wherein said electrical signal comprises irregularly spaced pulses between substantially long time intervals.

7. The arrangement as defined in claim 1 wherein said light source is adjusted for maximum radiation emission within the absorbtion region exciting the fluorescence.

8. The arrangement as defined in claim 1 wherein said water is subjected to daylight, said electrical signal being independent of said daylight.

9. The arrangement as defined in claim 1 including intensity stabilization means connected to said source of energy for maintaining constant the light intensity of said lamp means.

10. The arrangement as defined in claim 1 including auxiliary receiver means connected to said receiver means for receiving diffused light from said water and not responding to fluorescent light, said auxiliary receiving means compensating said electrical signal against clouding effects of said water.

11. The arrangement as defined in claim 1 wherein the pulse frequency and pulse energy for said discharge lamp means is arranged so that the average power consumption of said light source is substantially smaller than that transportable through a high impedance power cable of substantially long length.

12. The arrangement as defined in claim 1 including cable means connected to said light source for transmitting energy thereto, said cable means being a substantially high tensile strength cable with steel core, said electrical signal being transmitted through said cable as a superimposed modulated signal.

13. The arrangement as defined in claim 1 including battery means connected to said light source and said receiver means.

14. The arrangement as defined in claim 1 including buoy means and recording means for recording said electrical signal.

15. The arrangement as defined in claim 1 including filter means in said light source and said receiver means adapted to fluorescent radiation; and remote filter control means connected to said filter means for selectively controlling said filter means for correspondence to said radiation.

16. The arrangement as defined in claim 15 wherein said filter means is adapted to rhodamine concentration and bioplasma.

17. The arrangement as defined in claim 1 including separate pressure resistant housing means for said light source and said receiver means, said separate housing means being pivotable relative to each other.

18. The arrangement as defined in claim 1 including supporting means for supporting said arrangement below sea level.

* * * * *